US005863968A

United States Patent [19]

Irish et al.

[11] Patent Number: 5,863,968

[45] Date of Patent: Jan. 26, 1999

[54] HIGH TEAR STRENGTH HIGH CONSISTENCY ORGANOSILOXANE COMPOSITIONS COMPRISING FLUORINATED AND NON-FLUORINATED POLYORGANOSILOXANES

[75] Inventors: Paul Thomas Irish, Bay City; Myron Timothy Maxson, Sanford, both of Mich.

[73] Assignee: Dow Corning Corporation, Midland, Mich.

[21] Appl. No.: 635,357

[22] Filed: Apr. 19, 1996

[51] Int. Cl.[6] ................................ C08K 9/06; C08K 5/24

[52] U.S. Cl. .......................... 523/213; 524/261; 524/588; 525/478; 525/477; 525/479

[58] Field of Search .................................... 523/209, 213; 524/261, 588; 525/477, 478, 479

[56] References Cited

U.S. PATENT DOCUMENTS

| | | | |
|---|---|---|---|
| 3,159,601 | 12/1964 | Ashby | 260/46.5 |
| 3,220,972 | 11/1965 | Lamoreaux | 260/46.5 |
| 3,296,291 | 1/1967 | Chalk | 260/448.2 |
| 3,419,593 | 12/1968 | Willing | 260/448.2 |
| 3,445,420 | 5/1969 | Gust et al. | 260/37 |
| 3,516,946 | 6/1970 | Modic | 252/429 |
| 3,814,730 | 6/1974 | Karstedt | 260/46.5 |
| 3,928,629 | 12/1975 | Chandra et al. | 427/387 |
| 3,989,667 | 11/1976 | Lee et al. | 360/46.5 |
| 3,989,668 | 11/1976 | Lee et al. | 260/46.5 |
| 4,584,361 | 4/1986 | Janik et al. | 528/15 |
| 4,784,879 | 11/1988 | Lee et al. | 427/213 |
| 4,882,369 | 11/1989 | Maxson | 523/213 |
| 4,960,811 | 10/1990 | Evans | 524/265 |
| 5,036,117 | 7/1991 | Chung et al. | 522/172 |
| 5,302,632 | 4/1994 | Maxson | 523/213 |

FOREIGN PATENT DOCUMENTS

| | | |
|---|---|---|
| 62-158755 | 7/1987 | Japan . |

*Primary Examiner*—Randy Gulakowski
*Attorney, Agent, or Firm*—William F. Boley; Jennifer S. Warren

[57] ABSTRACT

A high-consistency organosiloxane composition comprising fluorinated and non-fluorinated polyorganosiloxanes, which upon the addition of suitable cure components can be cured to form elastomers having improved tear strength and good resistance to hydrocarbon oil weep. The present composition comprises a reinforcing silica filler that has been treated with a tetraalkyldisilazane.

24 Claims, No Drawings

HIGH TEAR STRENGTH HIGH CONSISTENCY ORGANOSILOXANE COMPOSITIONS COMPRISING FLUORINATED AND NON-FLUORINATED POLYORGANOSILOXANES

BACKGROUND OF INVENTION

The present invention is a high-consistency organosiloxane composition comprising fluorinated and non-fluorinated polyorganosiloxanes, which upon the addition of suitable cure components can be cured to form elastomers having improved tear strength and good resistance to hydrocarbon oil weep. The present composition comprises a reinforcing silica filler that has been treated with a tetraalkyldisilazane.

Curable compositions containing mixtures of fluorinated and non-fluorinated high consistency polydiorganosiloxanes are known. One of the more common repeating units that constitutes at least a portion of the units present in fluorinated polydiorganosiloxanes is the methyl-3,3,3-trifluoropropylsiloxy unit. When compared with cured elastomers prepared from polydimethylsiloxanes, elastomers prepared from fluorinated polydiorganosiloxanes typically exhibit inferior physical properties such as tensile and tear strength and elasticity and have a higher solubility in polar organic liquids such as alcohols, ketones and esters. This reduction in properties is compensated for by a lower solubility and a higher resistance to degradation in the aliphatic hydrocarbons present in aviation and automotive oils and fuels.

Compositions comprising high-consistency fluorinated and non-fluorinated polydiorganosiloxanes when cured typically provide an elastomer with physical properties that represent a compromise, with intermediate values for tensile, tear, and solvent resistance. One approach to increasing the physical properties of compositions comprising fluorinated and non-fluorinated polydiorganosiloxanes when cured, is to increase the compatibility of the polymers. For example, Evans et al., U.S. Pat. No. 4,960,811, describe a composition where 100 parts of a modified fluorinated polydiorganosiloxane containing both vinyl and silanol groups is blended with from one to 10 parts of a polydimethylsiloxane gum containing from one to about 10 weight percent of vinyl radicals.

Maxson, U.S. Pat. No. 5,302,632, describes a process for increasing the compatibility between high-consistency fluorinated and non-fluorinated polydiorganosiloxanes with a resultant increase in the physical properties of elastomers prepared from mixtures of these polymers. The improved compatibility is achieved by blending the polymers together with a reinforcing silica filler that is reacted with both fluorinated and non-fluorinated liquid polydiorganosiloxanes as filler treating agents. The high consistency polydiorganosiloxanes contain at least two alkenyl radicals per molecule and are cured by a hydrosilation reaction.

The present inventor has found that the tear strength of compositions comprising a high-consistency fluorinated and non-fluorinated polydiorganosiloxane can be improved by treating the reinforcing silica filler used in such compositions with a tetraalkyldisilazane. The improved tear strength can be achieved while maintaining a good resistance to hydrocarbon oil weep.

SUMMARY OF INVENTION

The present invention is a high-consistency organosiloxane composition comprising fluorinated and non-fluorinated polyorganosiloxanes, which upon the addition of suitable cure components can be cured to form elastomers having improved tear strength and good resistance to hydrocarbon oil weep. The present composition comprises a reinforcing silica filler that has been treated with a tetraalkyldisilazane.

DESCRIPTION OF INVENTION

The present invention is a high-consistency organosiloxane composition which upon the addition of suitable cure components can be cured to form fluorinated silicone elastomers having improved tear strength and good resistance to oil weep. The high-consistency organosiloxane composition by blending components comprising:

(A) 60 to 90 weight percent, based upon the combined weight of component (A) and component (B), of at least one high-consistency fluorine-containing polydiorganosiloxane comprising at least two alkenyl radicals per molecule and repeating units described by formula $R^1R^fSiO$, where $R^1$ is an alkyl radical comprising from one to about four carbon atoms and $R^f$ is a perfluoroalkylethyl radical comprising from three to about 12 carbon atoms, (B) 10 to 40 weight percent, based on the combined weight of component (A) and component (B), of at least one high consistency fluorine-free polydialkylsiloxane containing at least two alkenyl radicals per molecule, where the repeating units of the fluorine-free polydialkylsiloxane are described by formula $R^1{}_2SiO$ and $R^1$ is as previously described, and (C) 10 to 50 weight percent, based on the combined weight of component (A) and component (B) of a reinforcing silica filler having a surface area of at least 50 $m^2/g$; where the filler is treated with one to 50 weight percent, based on the weight of the reinforcing silica filler, of a tetraalkyldisilazane described by formula $R^1{}_2HSiNHSiR^1{}_2H$, where $R^1$ is as previously described.

In the present specification the term "high-consistency" refers to polydiorganosiloxanes having the consistency of a gum at 25° C. The viscosities of such polymers are typically characterized in terms of a Williams plasticity number that is measured in accordance with ASTM test procedure No. D926. This number can be from about 75 mm/100 to about 400 mm/100 at 25° C. for the fluorine-containing polydiorganosiloxane and from about 50 mm/100 to about 350 mm/100 at 25° C. for the fluorine-free polydialkylsiloxane.

The present composition includes at least one high consistency fluorine-containing polydiorganosiloxane, referred to hereinafter as component (A), and at least one fluorine-free polydialkylsiloxane, referred to hereinafter as component (B). Component (A) can comprise from about 60 to 90 weight percent of the combined weight of components (A) and (B) and conversely component (B) can comprise about 10 to 40 weight percent of the combined weight.

Both component (A) and component (B) contain at least two alkenyl radicals per molecule. Depending upon the combination of physical properties desired in the cured elastomer prepared using the present composition, up to three percent of the non-terminal repeating units of these polymers can contain silicon-bonded alkenyl radicals.

A least a portion of the repeating units in component (A) correspond to the formula $R^1R^fSiO$, where $R^1$ is an alkyl radical comprising from one to about four carbon atoms and $R^f$ is a perfluoroalkylethyl radical where the silicon atom is separated from the perfluoroalkyl radical by two non-fluorinated carbon atoms.

The perfluoroalkyl portion of $R^f$ can contain from one to about 10 carbon atoms, and includes but is not limited to perfluoromethyl, perfluoroethyl, perfluorobutyl, and perfluorooctyl. $R^1$ can be, for example, methyl, ethyl, propyl, butyl, and tert-butyl. The preferred component (A) is one where $R^f$ is 3,3,3-trifluoropropyl and $R^1$ is methyl.

Component (A) can be described by the general formula

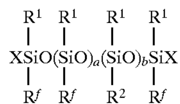

where $R^1$ and $R^f$ are as previously described, $R^2$ is an alkenyl radical comprising two to about 10 carbon atoms, each X is independently selected from a group consisting of hydroxy and $R^2$, the sum of a and b is selected so that the polymer has a Williams plasticity number of from about 75 mm/100 to 400 mm/100 at 25° C., and the value of b/(a+b) is from 0 to 0.03, with the proviso that when X is a hydroxy group b is at least 2. Alternatively the terminal group can be $XR^1_2SiO$, where $R^1$ and X are as previously described.

The alkenyl radicals represented by $R^2$ can comprise two to about 10 carbon atoms. $R^2$ can be, for example, vinyl, allyl butenyl, hexenyl, and decenyl. When $R^2$ is other than vinyl or allyl the ethylenically unsaturated carbon atoms are preferably located at the terminal position of the radical.

In a preferred composition component (A) is a mixture comprising 20 to 60 weight percent of hydroxy-terminated fluorine-containing polydiorganosiloxanes where b is 0, and 40 to 80 weight percent hydroxy-terminated fluorine-containing polydiorganosiloxanes where b/(a+b) is an average value within a range of about 0.001 to 0.02. Most preferred is where component (A) is a mixture comprising about 50 weight percent of hydroxy-terminated fluorine-containing polydiorganosiloxanes where b is 0, and about 50 weight percent hydroxy-terminated fluorine-containing polydiorganosiloxanes where b/(a+b) is an average value within a range of about 0.001 to 0.02. Preferred is when component (A) has a Williams plasticity number within a range of about 220 mm/100 to 280 mm/100 at 25° C.

Component (B) comprises repeating units of the formula $R^1_2SiO$, where each $R^1$ is an independently selected alkyl radical comprising one to about four carbon atoms as previously described. Preferred is when $R^1$ is methyl.

A preferred component (B) is a fluorine-free dimethylsiloxane described by formula

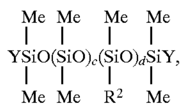

where Me is methyl, $R^2$ is an alkenyl radical comprising two to about 10 carbon atoms as previously described, each Y is independently selected from a group consisting of hydroxy and $R^2$, the sum of c and d is selected so the polymer has a Williams plasticity number within a range of about 50 mm/100 to 350 mm/100 at 25° C., and the value of d/(c+d) is from 0 to 0.03, with the proviso that d is at least 2 when Y is a hydroxy group. A more preferred component (B) is a mixture comprising about 50 weight percent fluorine-free dimethylsiloxanes where Y is vinyl and d=0, and 50 weight percent fluorine-free dimethylsiloxanes where Y is vinyl and d/(c+d) is a value of about 0.002. Preferred is when component (B) has a Williams plasticity number within a range of about 120 mm/100 to 200 mm/100 at 25° C.

The present compositions require the presence of a reinforcing silica filler which improves the physical strength of cured silicone elastomers prepared from the composition. The reinforcing silica filler can be of the fumed or precipitated type and should have a BET surface area of at least about 50 $m^2/g$. The reinforcing silica filler can have a surface area within a range of about 50 $m^2/g$ to greater than 400 $m^2/g$. Preferred is when the reinforcing silica filler has a surface area greater than about 100 $m^2/g$. Even more preferred is when the reinforcing silica filler has a surface area within a range of about 200 $m^2/g$ to 400 $m^2/g$.

The amount of reinforcing silica filler in the present composition can be varied from about 10 to 50 weight percent base on the combined weight of components (A) and (B). Preferred is when the reinforcing silica filler is about 15 to 25 weight percent of the combined weight of components (A) and (B).

Reinforcing silica fillers are typically treated with a low molecular weight organosilicon compound to prevent a phenomenon referred to as "creping" or "crepe hardening". These silica treating agents reduce the interaction between the polydiorganosiloxane and the reinforcing silica that causes the curable composition to undergo an increase in viscosity during blending and storage of the composition to the extent that the composition cannot be processed using conventional techniques and equipment. The advantages of the present composition are obtained by utilizing a specific class of compounds referred to as tetraalkyldisilazane as treating agent for the reinforcing silica filler: The class of tetraalkyldisilazanes is described by formula

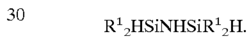

$R^1_2HSiNHSiR^1_2H.$ where each $R^1$ is an independently selected alkyl radical comprising from one to about four carbon atoms as previously described. Preferred is when the tetraalkyldisilazane is tetramethyldisilazane.

The concentration of tetraalkyldisilazane useful in the present composition can be within a range of about 1 to 50 weight percent of the weight of the reinforcing silica filler. Preferred is when the concentration of tetraalkyldisilazane in the present composition is within a range of about 5 to 15 weight percent of the weight of the reinforcing silica filler.

In addition to the tetraalkyldisilazane, other reinforcing silica treating agents may be used in the present compositions. In a preferred composition a hydroxy-terminated methylvinylsiloxane described by formula

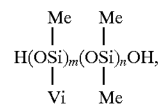

where Me is methyl, Vi is vinyl, m is a value from 1 to about 8, n is a value from 0 to about 7, and m+n is a value from about 5 to 8, is included in the composition. The hydroxy-terminated methylvinylsiloxane treating agent may comprise about 0.5 to 10 weight percent of the weight of the reinforcing silica filler. Preferred is a composition where the hydroxy-terminated methylvinylsiloxane treating agent comprises about 1 to 5 weight percent of the weight of the reinforcing silica filler.

The present compositions can be cured by adding standard curing agents suitable for curing such compositions to form silicone elastomers. One type of curing agent suitable for use with the present compositions are organic peroxides. One class of organic peroxides are referred to as vinyl-specific and require the presence of vinyl or other alkenyl radicals substituted on the polydiorganosiloxane polymers.

The second major class of peroxides are referred to as non-vinyl specific, and react with any type of hydrocarbon radical to generate a free radical at which cross-linking can be effected. The peroxide catalyst can include di-tertiary-butyl peroxide, tertiary-butyl-triethylmethyl peroxide, tertiary-butyl-tertiary-butyl-tertiary-triphenyl peroxide, t-butyl perbenzoate and di-tertiary alkyl peroxides such as dicumyl peroxide and 2,5-bis(tert-butyl peroxy)-2,3-dimethylhexane. Other suitable peroxide catalysts which effect curing through saturated as well as unsaturated hydrocarbon groups on the siloxane chains are aryl peroxides such as benzoyl peroxides, mixed alkyl-aryl peroxides such as tertiary-butyl perbenzoate, chloroalkyl peroxides such as 1,4-dichlorobenzoyl peroxide, 2,4-dichlorobenzoyl peroxide, monochlorobenzoyl peroxide, and benzoyl peroxide. A preferred peroxide catalyst is 2,5-bis(tert-butyl peroxy)-2,3 -dimethylhexane. Generally about 0.1 to 10 weight percent of the peroxide, based on total weight of the composition, can be effective to cure the present compositions.

The present compositions can also be cured by means of a platinum-group metal catalyzed hydrosilation reaction using an organohydrogensiloxane as crosslinker. To effect curing of the present composition the organohydrogensiloxane must contain more than two silicon-bonded hydrogen atoms per molecule. The organohydrogensiloxane can contain from about four to 20 silicon atoms per molecule and can have a viscosity of up to about 10 Pa·s at 25° C. The silicon-bonded organic groups present in the organohydrogensiloxane can be substituted and unsubstituted alkyl radicals comprising one to four carbon atoms that are free of ethylenic or acetylenic unsaturation. The units of the organohydrogenpolysiloxane can include $HSiO_{1.5}$, $R^3HSiO$ and $R^3{}_2HSiO_{0.5}$, in addition to one or more of monoorganosiloxy, diorganosiloxy, triorganosiloxy, and $SiO_{4/2}$ units. The substituent $R^3$ can be the same as $R^1$ or $R^f$, as previously described. To ensure adequate curing of the composition it is preferable that the hydrocarbon radical of the organohydrogensiloxane be selected from a group consisting of methyl and 3,3,3-trifluoropropyl.

Alternatively, the organohydrogensiloxane can be a cyclic compound comprising diorganosiloxy and organohydrogensiloxy units or a branched compound described by formula $Si(OSiR^3{}_2H)_4$, where $R^3$ is as previously described.

The molar ratio of silicon-bonded hydrogen atoms to the total concentration of vinyl or other alkenyl radicals in all of the high consistency polydiorganosiloxanes (components (A) and (B)) is important with respect to the properties of the cured silicone elastomers. The optimum ratio for the present compositions will be determined at least in part by the concentration of ethylenically unsaturated hydrocarbon substituents in components (A) and (B) and the type of organohydrogensiloxane crosslinker. Generally a useful molar ratio of silicon-bonded hydrogen atoms to alkenyl radicals provided by components (A) and (B) is within a range of about 1:1 to 5:1.

Platinum group metal-containing catalyst useful to catalyze curing of the present compositions can be any of those known to catalyze the reaction of silicon-bonded hydrogen atoms with silicon-bonded alkenyl groups. By "platinum group metal" it is meant ruthenium, rhodium, palladium, osmium, iridium, and platinum. Examples of useful platinum group metal-containing catalyst can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat No. 3,928,629 all of which are hereby incorporated by reference to show useful platinum group metal-containing catalysts and methods for their preparation.

The preferred platinum group metal for use as a catalyst to effect cure of the present compositions by hydrosilation is platinum. Therefore, a preferred hydrosilation catalyst for curing the present composition is selected form a group consisting of platinum metal, platinum compounds, and platinum complexes. Platinum compounds such as chloroplatinic acid, chloroplatinic acid hexahydrate, and platinum dichloride and particularly complexes of such compounds with low-molecular weight vinyl-containing organosiloxanes are preferred catalyst because of their high activity and compatibility with the organosiloxanes in the present compositions. These complexes are described in Willing, U.S. Pat. No. 3,419,593, which is hereby incorporated by reference for its teaching of such complexes. Complexes with low-molecular weight organosiloxanes were the silicon bonded hydrocarbon radicals are vinyl and either methyl or 3,3,3-trifluoropropyl are particularly preferred because of their ability to catalyze a rapid curing of the present compositions at temperatures greater than about 70° C.

The platinum group metal-containing catalyst that may be used in the present composition to effect curing by hydrosilation may be microencapsulated in a thermoplastic organic or organosilicon resin in a matrix or coreshell type of structure. Microencapsulated platinum-group metal hydrosilation catalyst together with methods for their preparation are described in Lee et al., U.S. Pat. No. 4,784,879, which is incorporated herein by reference for its teaching of such catalyst useful in the present composition.

A preferred platinum group metal-containing catalyst for use to cure the present compositions comprises the reaction product of chloroplatinic acid with dimethylvinylsiloxy terminated polymethyl (3,3,3-trifluoropropyl)siloxane.

The platinum group metal-containing catalyst may be added to the present compositions in an amount equivalent to as little as 0.001 part by weight of elemental platinum group metal per one million parts (ppm) of the composition. Preferably, the concentration of platinum group metal in the composition is that providing the equivalent of at least 1 ppm of elemental platinum group metal. A catalyst concentration providing the equivalent of about 3 to 50 ppm of elemental platinum group metal in the composition is preferred.

When the present composition is mixed with an organohydrogensiloxane cross-linker and a platinum group metal-containing catalyst, the composition may begin to cure at room temperature. Therefore, to increase the storage stability of the compositions or obtain a longer working time it may be useful to add a catalyst inhibitor to the composition. Such platinum group metal-containing catalyst inhibitors are known in the art and include acetylenic compounds as disclosed in Kookootsedes et al., U.S. Pat. No. 3,445,420. Acetylenic alcohols such as 2-methyl-3-butyn-2-ol and 1-ethynyl-1-cyclohexanol are preferred inhibitors that will suppress the activity of a platinum-containing catalyst at ambient temperatures while allowing curing to proceed rapidly at temperatures about 70° C.

Other platinum group metal-containing catalyst inhibitors that may be used in the present composition include those described in Chung et al., U.S. Pat. No. 5,036,117; Janik, U.S. Pat. No. 4,584,361; and ethylenically unsaturated cyclic siloxanes of the type described in Lee et al., U.S. Pat. No. 3,989,667.

The amount of platinum group metal-containing catalyst inhibitor required is that needed to produce the desired shelf-life and/or pot-life and yet not extend the cure time of the curable composition to an impractical level. The amount will vary widely and will depend upon the particular inhibitor that is used, the nature and concentration of the platinum group metal-containing catalyst, and the nature of the organohydrogensiloxane crosslinker. Inhibitor added in amounts as small as one mole of inhibitor per mole of platinum group metal will in some instances cause a satisfactory inhibition of the catalyst. In other cases as much as 500 moles of inhibitor for every mole of platinum group metal may be needed to achieve the desired combination of pot life and cure time.

To provide for improved shelf stability of the present compositions when compounded with a platinum group metal-containing catalyst, the curable composition may be packaged in two parts with the platinum group metal-containing catalyst in one part and the organohydrogensiloxane crosslinker in the other part.

In addition to the above described cure components, base compositions prepared by the present method can have added to them optional ingredients such as heat stabilizers, pigments, flame-retardants, electrically conductive materials, and thermally conductive materials In a preferred method for preparing the present curable compositions, the reinforcing silica filler is treated with the tetraalkyldisilazane, and optionally other silica treating agents as described herein, in the presence of components (A) and (B) by mixing under relatively high shear using a dough-type mixer. The mixing operation is continued until the reinforcing silica filler is completely treated and uniformly dispersed throughout the composition to form a homogeneous material. The mixing operation can require anywhere from about 15 minutes to 2 hours, depending upon such factors as the amount of material being processed, the viscosity of the material, and the shear rate of the mixer.

Alternatively, the reinforcing silica filler may be treated with the tetraalkyldisilazane, and optionally other silica treating agents as described herein, prior to mixing with the high-consistency organosiloxane components (A) and (B).

It is preferred that the latter part of the mixing operation be conducted at a temperature within a range of about 100° C. to 250° C. under reduced pressure to remove volatiles from the composition.

Curable compositions are prepared from the present composition by blending the resultant homogeneous mixture of polymers and treated filler with curing agents as described above. If a microencapsulated platinum group metal containing catalyst is used, care should be taken during incorporation of this ingredient into the composition to avoid rupturing of the microcapsules and release of the catalyst.

The following examples are provided to illustrate the present invention. These examples are not intended to limit the scope of the present claims. In the examples the reported Williams plasticity numbers were measured using ASTM Standard D926, with the testing conducted at a temperature of 25° C.

A base composition was prepared as described in Table 1. Components 1 through 5 were added to a Sigma blade dough mixer and mixed for 5 minutes with a nitrogen purge. The water (component 8) was added to the mixer and mixing continued for an additional 5 minutes. Component 7 was then added to the mixer and mixing continued for another 5 minutes. The reinforcing silica filler was added to the mixer slowly to keep the forming base massed. After completion of addition of the reinforcing silica filler hexamethyldisilazane (HMDS) to form a reference composition, tetramethyldisilazane (TMDS), or both HMDS and TMDS as described in Table 2 were added to the mixer and mixing continued for 30 minutes. The mixture was heated to a temperature of 175° C. to 185° C. with a nitrogen purge and mixing continued for 3 hours. The resulting base was cooled with continuing mixing. After cooling the base a curable composition was made by mixing into each 100 weight parts of the base, 1 weight part of 2,5-bis(tert-butyl peroxy)-2,3-dimethylhexane as catalyst and 1 weight part of a 50 weight percent composition of cerium hydrate in a dimethylhydroxysiloxy-terminated polydimethylsiloxane Gum having a Williams plasticity number of about 152 mm/100 to 178 mm/100. Samples of the catalyzed composition were press cured at 171° C. for 10 minutes and then post cured at 200° C. for four hours in a hot air oven. The potential for weep of the cured samples was tested by immersing the samples in a commercially available hydrocarbon based automotive engine oil of 5W30 weight at 150° C. for 96 hours. The percent weight gain of the sample was determined as an indication of the potential for weep and is reported in Table 2. Other physical properties of the samples were tested by standard methods. The test methods and the results of the testing are reported in Table 2.

TABLE 1

Formulation of Tested Compositions

| No. | Parts (Wt.) | Component Description |
|---|---|---|
| 1 | 28.46 | Methyltrifluoropropylhydroxysiloxy terminated methyltrifluoropropyl (methylvinyl) polysiloxane comprising 0.6 mole percent MeViSiO units and having a Williams plasticity of 229 mm/100 to 279 mm/100 |
| 2 | 28.46 | Methyltrifluoropropylhydroxysiloxy terminated methyltrifluoropropylpolysiloxane having a Williams plasticity of 230 mm/100 to 356 mm/100 |
| 3 | 2.32 | Dimethylvinylsiloxy terminated polydimethyl-(methylvinyl)siloxane having 1.88 mole percent MeViSiO units and a Williams plasticity of 127 mm/100 to 178 mm/100 |
| 4 | 7.53 | Dimethylvinylsiloxy terminated polydimethylsiloxane having a Williams plasticity of 140 mm/100 to 165 mm/100 |
| 5 | 7.53 | dimethylvinylsiloxy terminated polydimethyl (methylvinyl) siloxane having about 0.14 mole percent MeViSiO units and a Williams plasticity of 140 mm/100 to 165 mm/100 |
| 6 | 18.55 | Fumed reinforcing silica having a BET surface area of 225 $m^2/g$ |
| 7 | 0.29 | Dimethylhydroxy terminated polydimethyl (methylvinyl) siloxane described by formula $H(OSiMeVi)_m(OSiMe2)_nOH$ where m and n are such that the material comprises about 9.8 weight percent vinyl and 7 weight percent hydroxy |
| 8 | 4.00 | Methyl (3,3,3-trifluoropropyl)hydroxysiloxy terminated methyl (3,3,3-trifluoropropyl) polysiloxane having a viscosity of 100 mPa · s at 25° C. |
| 9 | 0.75 | Water |
| 10 | *,** | Hexamethyldisilazane (HMDS), tetramethyldisilazane (TMDS) or a mixture of HMDS and TMDS as described in Table 2 |

TABLE 2

Physical Properties Test Methods and Results

| Physical Property | Test Method | Test Results HMDS[a] | TMDS[b] | HMDS + TMDS[c] |
|---|---|---|---|---|
| Durometer (Shore A) | ASTM D2240 | 39 | 44 | 45 |
| Tensile, MPa | ASTM 412 | 7.8 | 7.4 | 7.4 |

TABLE 2-continued

Physical Properties Test Methods and Results

| Physical Property | Test Method | Test Results HMDS[a] | TMDS[b] | HMDS + TMDS[c] |
|---|---|---|---|---|
| Tear (Die B), kN/m | ASTM 625 | 20.7 | 28.9 | 27.1 |
| Elongation, % | ASTM 412 | 549 | 414 | 463 |
| Modulus (100%), MPa | ASTM 412 | 0.1 | 1.3 | 1.3 |
| Compression Set, % | ASTM 395 | 7 | 9.3 | 8.9 |
| Weight Gain, % | | — | 6.7 | 6.2 |

[a]2.08 weight parts hexamethyldisilizane (HMDS)
[b]2.08 weight parts tetramethyldisilazane (TMDS)
[c]1.58 weight parts HMDS + 0.5 weight parts TMDS

We claim:

1. An organosiloxane composition comprising:

(A) 60 to 90 weight percent, based upon the combined weight of component (A) and component (B), of at least one high-consistency fluorine-containing polydiorganosiloxane comprising at least two alkenyl radicals per molecule and repeating units described by formula $R^1R^fSiO$, where $R^1$ is an alkyl radical comprising from one to about four carbon atoms and $R^f$ is a perfluoroalkylethyl radical comprising from three to about 12 carbon atoms, (B) 10 to 40 weight percent, based on the combined weight of component (A) and component (B), of at least one high consistency fluorine-free polydialkylsiloxane comprising at least two alkenyl radicals per molecule, where the repeating units of the fluorine-free polydialkylsiloxane are described by formula $R^1{}_2SiO$ and $R^1$ is as previously described, and (C) 10 to 50 weight percent, based on the combined weight of component (A) and component (B) of a reinforcing silica filler having a surface area of at least 50 $m^2/g$; where the filler is treated with one to 50 weight percent, based on the weight of the reinforcing silica filler, of a tetraalkyldisilazane described by formula $R^1{}_2HSiNHSiR^1{}_2H$, where $R^1$ is as previously described.

2. An organosiloxane composition according to claim 1, where $R^1$ is methyl and $R^f$ is 3,3,3-trifluoropropyl.

3. An organosiloxane composition according to claim 1, where component (A) is described by formula

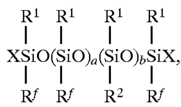

where $R^1$ and $R^f$ are as previously described, $R^2$ is an alkenyl radical comprising two to about 10 carbon atoms, each X is independently selected from a group consisting of hydroxy and $R^2$, the sum of a and b is selected such that component (A) has a Williams plasticity number of about 75 mm/100 to 400 mm/100 at 25° C., and the value of b/(a+b) is within a range of about 0 to 0.03, with the proviso that when X is a hydroxy group b is at least 2.

4. A composition according to claim 3, where component (A) is a mixture comprising 20 to 60 weight percent of hydroxy-terminated fluorine-containing polydiorganosiloxanes with b=0, and 40 to 80 weight percent of hydroxy-terminated fluorine-containing polydiorganosiloxanes where b/(a+b) is an average value within a range of about 0.001 to 0.02.

5. A composition according to claim 3, where component (A) is a mixture comprising about 50 weight percent of a hydroxy-terminated fluorine-containing polydiorganosiloxane where b is 0, and about 50 weight percent of a hydroxy-terminated fluorine-containing polydiorganosiloxane where b/(a+b) is a value within a range of about 0.001 to 0.02.

6. A composition according to claim 1, where component (A) has a Williams plasticity number within a range of about 220 mm/100 to 280 mm/100 at 25° C.

7. A composition according to claim 1, where component (B) is described by formula

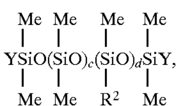

where Me is methyl, $R^2$ is an alkenyl radical comprising two to about 10 carbon atoms, each Y is independently selected from a group consisting of hydroxy and $R^2$, the sum of c and d is selected such that component (B) has a Williams plasticity number within a range of about 50 mm/100 to 350 mm/100 at 25° C., and the value of d/c+d is from 0 to 0.03, with the proviso that d is at least 2 when Y represents a hydroxy group.

8. A composition according to claim 7, where component (B) is a mixture comprising fluorine-free dimethylsiloxanes where Y is vinyl and d is zero, and fluorine-free dimethylsiloxanes where Y is vinyl and d/c+d is a value of about 0.002.

9. A composition according to claim 1, where component (B) has a Williams plasticity number within a range of about 120 mm/100 to 200 mm/100 at 25° C.

10. A composition according to claim 1, where the reinforcing silica filler has a surface area greater that about 100 $m^2/g$.

11. A composition according to claim 1, where the reinforcing silica filler has a surface area within a range of about 200 $m^2/g$ to 400 $m^2/g$.

12. A composition according to claim 1, comprising about 15 to 50 parts by weight of the reinforcing silica filler, based on the combined weights of component (A) and component (B).

13. A composition according to claim 1, where the reinforcing silica filler is treated with tetramethyldisilazane.

14. A composition according to claim 1, where the tetraalkyldisilazane comprises about 5 to 15 weight percent of the weight of the reinforcing silica filler.

15. A composition according to claim 1 further comprising about 0.5 to 10 weight percent, based on the weight of the reinforcing silica filler, of a hydroxy-terminated methylvinylsiloxane treating agent described by formula

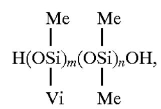

where Me is methyl, Vi is vinyl, m is a value from 1 to about 8, n is a value from 0 to about 7, and m+n is a value of about 5 to 8.

16. A composition according to claim 15 where the hydroxy-terminated methylvinylsiloxane treating agent comprises about 1 to 5 weight percent of the reinforcing silica filler.

17. A composition according to claim 1 further comprising an organic peroxide in an amount sufficient to effect curing of the composition.

18. A composition according to claim 17 where the organic peroxide is 2,5-bis(tert-butyl peroxy)-2,3-dimethylhexane.

19. A fluorosilicone elastomer prepared from the composition of claim 17.

20. A composition according to claim 1 further comprising a platinum-group metal hydrosilation catalyst and an organohydrogensiloxane crosslinker in amounts sufficient to effecting curing of the composition.

21. A composition according to claim 20, where the platinum-group metal hydrosilation catalyst comprises platinum metal or a compound of platinum.

22. A composition according to claim 21, where the platinum-group metal hydrosilation catalyst is the reaction product of chloroplatinic acid with dimethylvinylsiloxy terminated polymethyl(3,3,3-trifluoropropyl)siloxane.

23. A composition according to claim 20, where the composition is packaged in two parts with the platinum group metal-containing catalyst in one part and the organohydrogensiloxane in a second part.

24. An organosiloxane elastomer prepared from the composition of claim 20.

* * * * *